United States Patent [19]
Swanson

[11] 4,183,165
[45] Jan. 15, 1980

[54] ANIMAL TRAP

[76] Inventor: Kenneth Swanson, R.R. #1, Waverly, Minn. 55390

[21] Appl. No.: 820,862

[22] Filed: Aug. 1, 1977

Related U.S. Application Data

[63] Continuation of Ser. No. 653,098, Jan. 28, 1976, abandoned.

[51] Int. Cl.² ............................................. A01M 23/26
[52] U.S. Cl. ........................................................ 43/88
[58] Field of Search ...................................... 43/88, 90

[56] References Cited

U.S. PATENT DOCUMENTS

| | | | |
|---|---|---|---|
| 1,404,070 | 1/1922 | Thompson | 43/88 X |
| 1,672,051 | 6/1928 | Beardsley | 43/88 |
| 1,794,228 | 2/1931 | Hahus | 43/88 |
| 2,877,596 | 3/1959 | Elencik | 43/88 |

Primary Examiner—Harold D. Whitehead
Attorney, Agent, or Firm—Wicks & Nemer

[57] ABSTRACT

An animal trap including a base having first and second jaws pivotally mounted thereon. A trip plate pivotally carried by said base and a catch notch on said trip plate together with a catch bar pivotally carried by the base for engagement with a jaw and the catch notch to set the trap. A coil spring carried by said base normally urges said jaws together in clamping relation when said trip plate is actuated thereby releasing the catch bar from the jaw.

2 Claims, 6 Drawing Figures

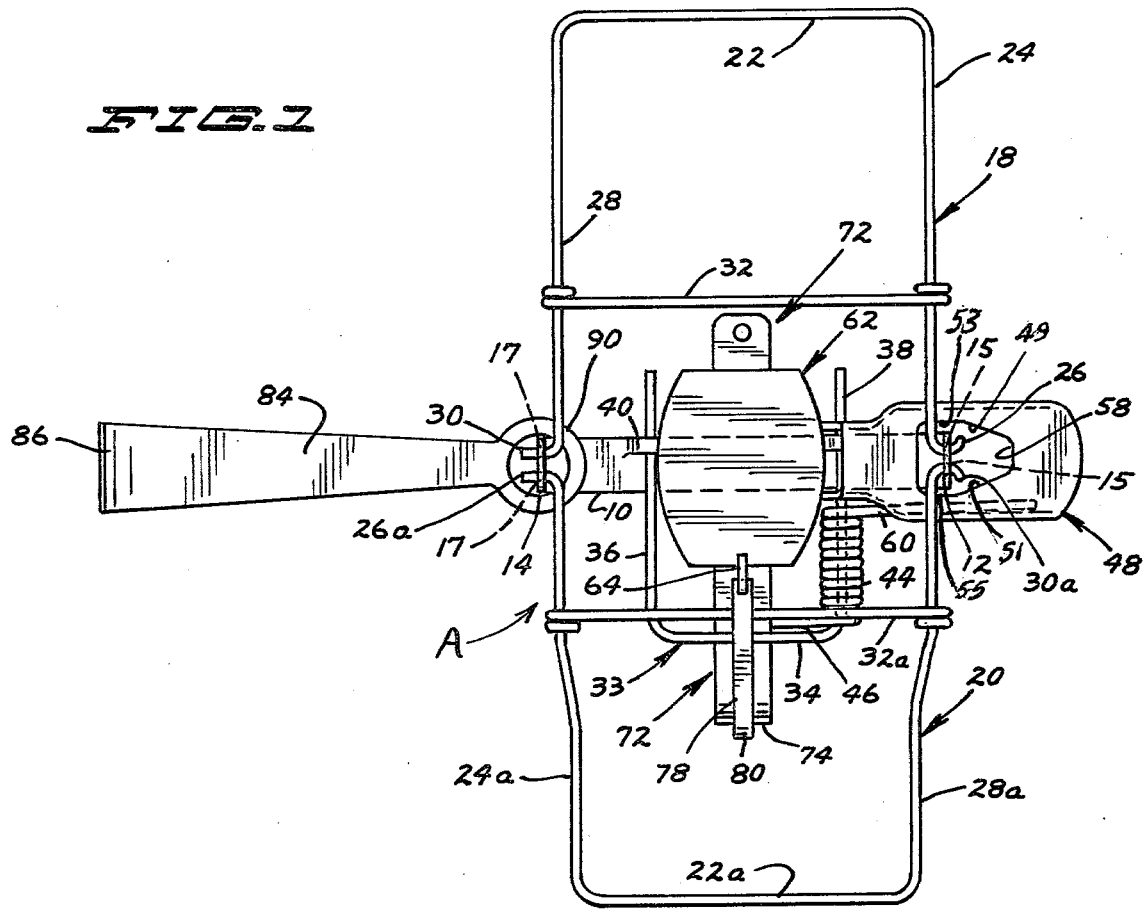
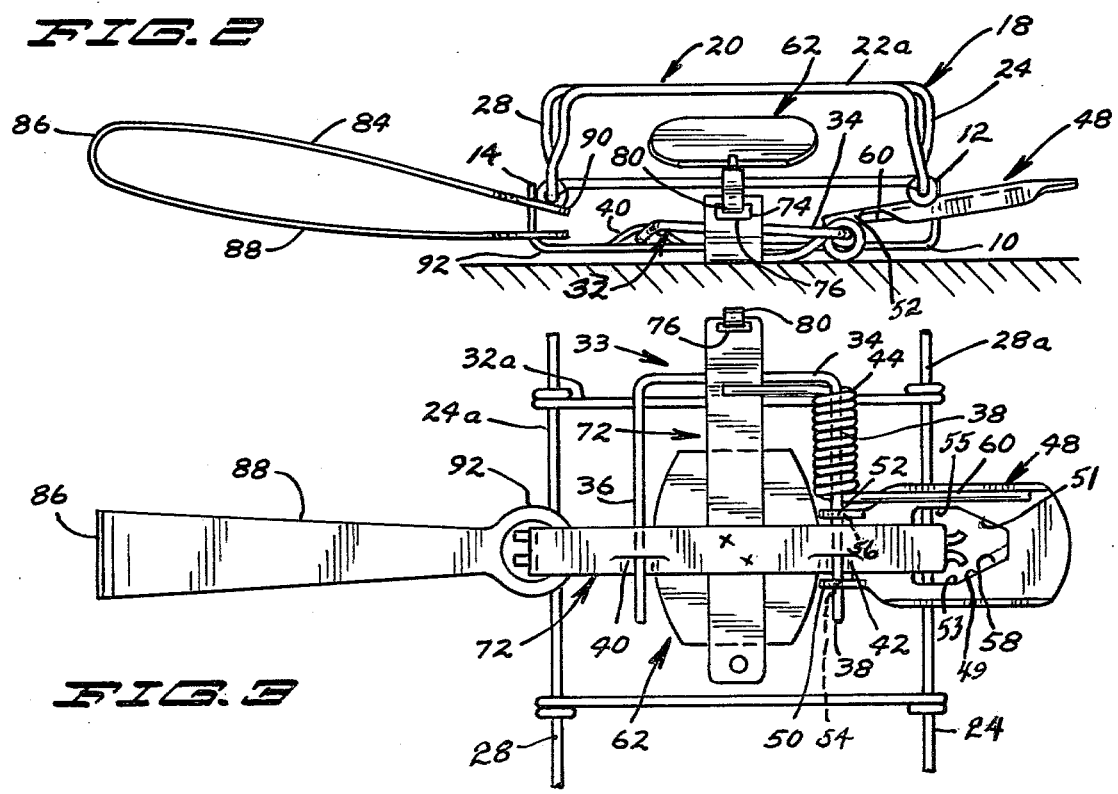

ANIMAL TRAP

This is a continuation of application Ser. No. 653,098 filed Jan. 28, 1976 and now abandoned.

SUMMARY

The invention relates to an improvement in animal traps and more particularly to a trap which has a pair of jaws pivotally mounted on a base. The jaws are urged together by means of a coil spring mounted on the base, and the jaws are placed in a set or open position by means of a trip plate engaged by a catch bar positioned over a cross bar on one of the jaws. The jaws are released to clamping position by pressure on the trip plate which releases the catch bar from the cross bar on the jaw. The jaws clamp in wuch a way that an animal is immediately killed humanely as the jaws engage the body of the animal.

Further the jaws are parallely disposed and the trap is placed at an animal run with the jaws parallel to the run whereby the animal in passing between the parallel jaws and on the trip plate is clamped between the jaws for a quick, positive, and humane killing of the trapped animal. Due to the position of the trip plate relative to the parallel jaws it is difficult to trip the plate unless the animal approaches the trap on a line parallel to the parallel jaws whereby the humane killing is accomplished.

The invention will appear more clearly from the following detailed description when taken in connection with the accompanying drawings, showing by way of example a preferred embodiment of the inventive idea wherein like numerals refer to like parts throughout.

In the drawings forming part of this application:

FIG. 1 is a top plan view of an animal trap embodying the invention and shown in open set position.

FIG. 2 is an end view of the trap as shown in FIG. 1.

FIG. 3 is a bottom plan view of the trap as shown in FIGS. 1 and 2.

Figure 4:
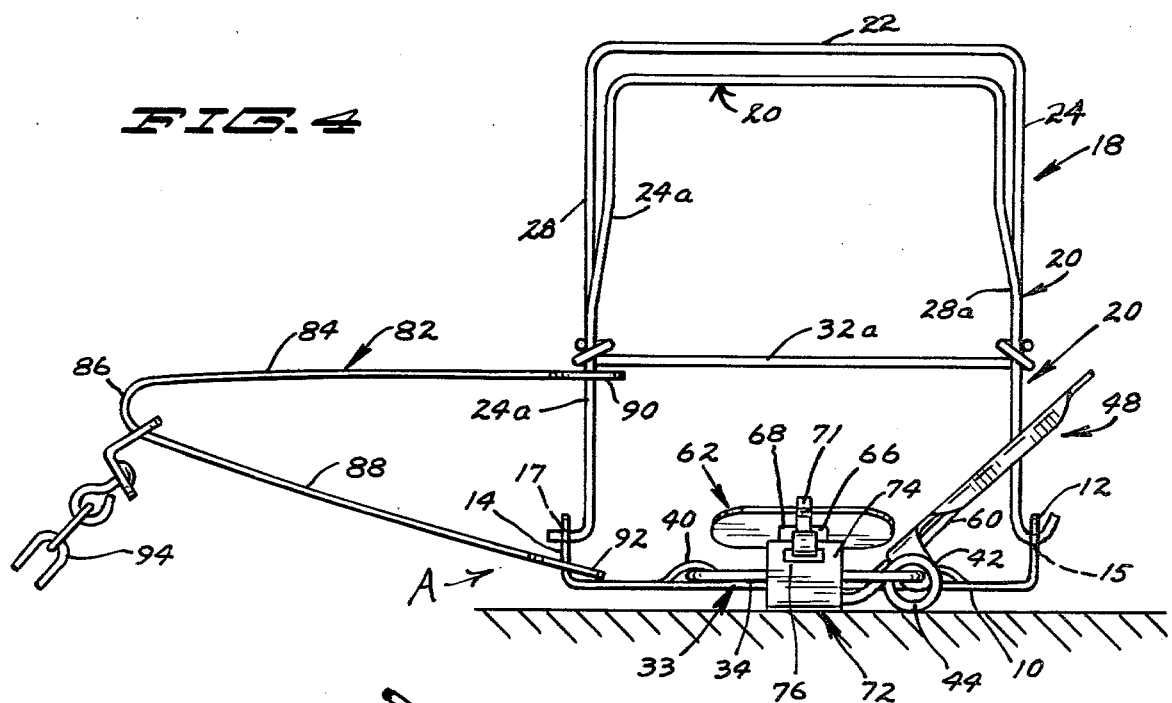
FIG. 4 is a side view of the trap in released position.

Referring to the drawings in detail, the trap A includes the base plate 10 which has formed on one end thereof the outer upturned flange 12 and on the other end the inner upturned flange 14. Each of the flanges 12 and 14 has a pair of spaced holes 15 and 17 respectively, formed therethrough. Further provided is a pair of substantially identical jaws 18 and 20 each formed of wire. Identical numbers identify identical parts but accompanied by a lower case letter a.

Figure 5:
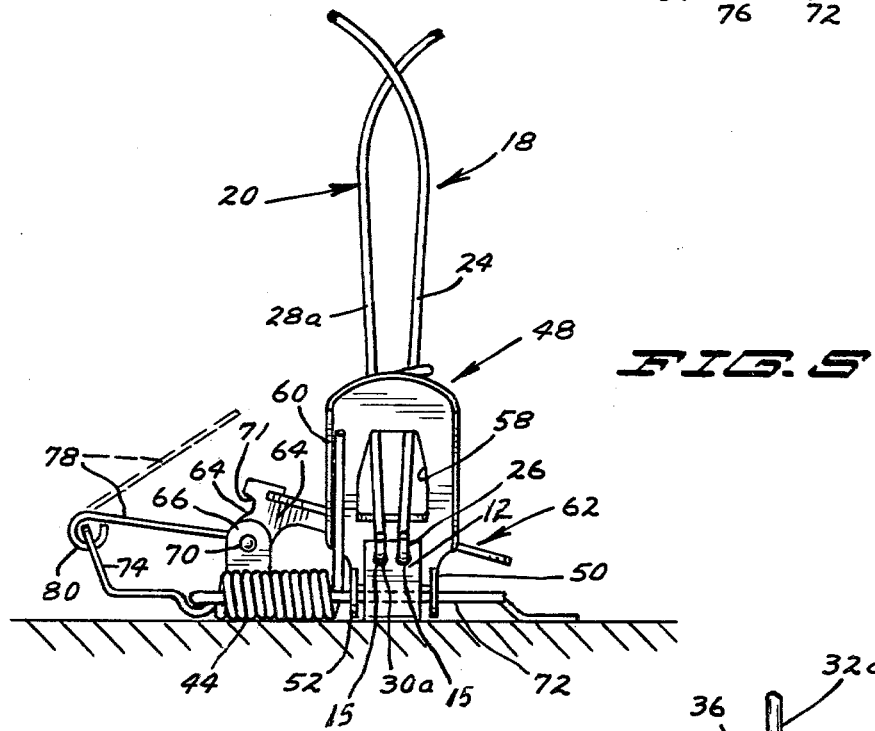
FIG. 5 is an end view of the trap as shown in FIG. 4.
Figure 6:
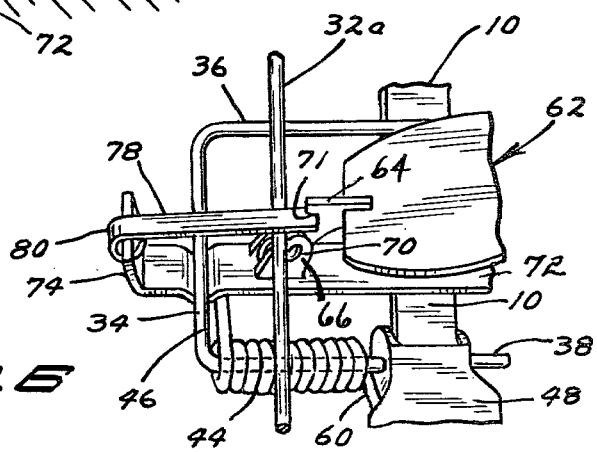
FIG. 6 is a perspective view of a portion of that shown in FIG. 5.

The jaw 18 includes base portion 22 from one end of which extends the first right angular leg 24 which terminates in the outer hook end 26. Extending at a right angle from the other end of the base portion 22 is the second leg 28 at the outer end of which is formed the hook 30. The legs 24 and 28 are connected and braced by the cross bar 32, and the hooks 26 and 30a are engaged in the holes 15 of the flange 12 with the hooks 26a and 30 engaged in the holes 17 of the flange 14 thereby pivotally mounting jaws 18 and 20 on the base. The jaws 18 and 20 are substantially identical except the base 22a is narrower than base 22 of jaw 18 and the legs 24a and 28a are shorter than the legs 24 and 28 of the jaw 18 whereby the upper portion of jaw 20 is received within the upper portion of jaw 18 in clamping engagement, particularly FIGS. 2, 4 and 5.

The numeral 33 designates a U-shaped support which includes the base portion 34 from which extends the right angular legs 36 and 38 with the leg 36 extended through the half loop 40 punched out of the base 10 and the leg 38 extended through the half loop 42 also punched out of the base 10 thereby mounting the support 33 on the base 10.

Mounted on the leg 38 of the support 32 is coil spring 44 with the first end leg 46 thereof anchored by engagement of the same under the cross base 72.

Further provided is the setting plate 48 formed at the inner end with the spaced ears 50 and 52 each formed with a hole 54 and 56 respectively, and through which the leg 38 of the support 33 extends to thereby mount the plate 48 on the leg 38. The plate 48 has formed therethrough the opening 58 having the diverging side edges 49 and 51 terminating in the parallel side edges 53 and 55. The legs 24 and 28a extend through the opening 58. The plate 48 is normally urged into an upward position as in FIGS. 4 and 5 by means of the second end leg 60 of the coil spring 44.

The numeral 62 designates the pressure trip plate formed with the extension 64. Extending upwardly from the base 10 are a pair of ears 66 and 68 particularly FIGS. 4 and 5 to which the extension 64 is pivotally mounted by means of the pin 70 with the plate 62 overlying the base 10 transversely. The extension 64 has formed thereon the notch 71.

Additionally provided is the cross base member 72 secured to and centrally of the base 10. One end of the cross base 72 if formed with the upturned flange 74 formed with slot 76. A catch member 78 is provided which has formed on one end thereof the loop 80 which is in engagement with the slot 76 of the flange 74 so as to pivotally mount one end of the catch member 78. The catch member 78 is of a length so as to engage the notch 71 of the pressure trip plate 62, particularly FIGS. 1, 2 and 3 when the trap is "set."

The numeral 82 designates a U-shaped spring including the first leg 84 terminating at one end in the bight 86 which terminates in the second leg 88. Formed on the other end of the first leg 84 of the spring 82 is the loop 90, and formed on the outer free end of the leg 88 is the loop 92 in alignment with the loop 90. The loop 92 is positioned upon the upturned flange 14 with the leg 28 of jaw 18 and the leg 24a extended through the loop 90 thereby mounting the spring 82 upon the jaws of the trap. Further provided is the anchor chain 94 connected to the spring 82 at one end with the other end connectable to a tree or a post driven into the ground generally with the longitudinal axis of the base 10 parallel to and substantially on a path used by an animal to be trapped. Thus as the animal walks over the trap the jaws come up from the sides of the animal and clamp it on its sides. Access is thereby provided for the animal.

OPERATION

The trap A is set in the following manner. Pressure is applied by the feet of the user or otherwise downwardly upon the setting plate 48 against the action of spring 44 and upon the leg 84 of spring 82 to the positions shown in FIGS. 1–3 whereby the jaws 18 and 20 may be pivotally flattened and held in the positions of FIGS. 1–3. With the jaws held in the flattened positions the catch member 78 is placed over the cross bar 32a, nd the end of the catch member 78 engaged in the notch 71 of extension 64 of the pressure trip plate 62. With the catch member 78 in such a position the jaws are both held flat out and wide open. With a slight downward pressure on the pressure trip plate 62 the same is pivoted on the pin 70 thereby disengaging the end of the catch member 78 from the notch 71 of the extension 74 of the trip plate 62. As a result the jaws 18 and 20 pivot upwardly together in clamping relation due to the action of the springs 44 and 82 with the outer arcuate ends of the jaws in overlapping relation, particularly FIGS. 4 and 5. More specifically, the plate 48 with the urging of the leg 60 of spring 44 raises both jaws with the legs 24 and 28a within the opening 58, the edges 49 and 51 guiding the legs together.

Having thus described the invention, what is claimed as new and desired to be secured by Letters Patent is:

1. An animal trap comprising:
   (a) an elongated base,
   (b) first and second jaws each having spaced substantially parallel legs of identical length joined at the outer free ends by a
   (c) straight base bar normal to said legs,
   (d) the straight base bar of said second jaw being of less length than said straight base bar of said second jaw,
   (e) each of said legs of said jaws being formed arcuately inwardly towards the other jaw and the legs of said second jaw shorter than those legs of said first jaw whereby the cross bar of said second jaw bypasses the cross bar of said first jaw to thereby cause the jaws to substantially engage the full body of the animal to be trapped,
   (f) a cross bar connected to said spaced legs intermediate the outer and inner ends thereof and parallel to said base bar,
   (g) means pivotally mounting each of said legs at the inner ends to said base,
   (h) a pressure trip plate pivotally mounted on
   (i) a base cross bar mounted on said base and normal thereto
   (j) a catch notch member carried by said trip plate,
   (k) a catch bar pivotally mounted at one end on said cross bar
   (l) a U-shaped support having a base portion from which extends spaced right angular parallelly disposed legs mounted on and extending from said base at a right angle thereto,
   (m) a setting plate pivotally mounted on one leg of said U-shaped support,
   (n) said setting plate having an opening therein and through which a leg of each jaw extends,
   (o) a coil spring mounted on one of said legs of said U-shaped support and having first and second free end legs,
   (p) said first free end leg of said spring engaged under said base cross bar and
   (q) said second free end leg of said spring engaged under said setting plate adapted to urge said setting plate upwardly against a leg of each of said jaws to urge said jaws in clamping relationship and allow said jaws to be opened when said setting plate is depressed towards said base against the urging of said spring, said jaws held in a spread apart condition by said catch bar positioned over a cross bar of one of said jaws and in engagement with said catch notch of said trip plate and said jaws released to clamping position by a pressure exerted upon said trip plate whereby said catch bar is released from said catch notch to allow said second free end of said coil spring to pivotally move said setting plate upwardly against a leg of each of said jaws.

2. The device of claim 1 further characterized by
   (a) a U-shaped spring having first and second legs with a loop formed on the outer end of the first leg of the spring and
   (b) a loop formed on the outer end of the second leg of the spring with a leg of each of said jaws extended through said loop of said first leg,
   (c) means mounting said loop of said second leg of said spring on said base so that when said jaws are spread apart into set position said loop of said first spring leg and said leg are held in a compressed and downward position and when said trap is tripped said loop of said first leg of said spring urges said jaws together in clamping relation together with said setting plate.

* * * * *